(12) United States Patent
Gewaltig et al.

(10) Patent No.: US 7,356,185 B2
(45) Date of Patent: Apr. 8, 2008

(54) PREPARATION OF A DIGITAL IMAGE WITH SUBSEQUENT EDGE DETECTION

(75) Inventors: Marc-Oliver Gewaltig, Obertshausen (DE); Edgar Körner, Seligenstadt (DE); Ursula Körner, Seligenstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 826 days.

(21) Appl. No.: 10/456,209

(22) Filed: Jun. 5, 2003

(65) Prior Publication Data

US 2004/0037466 A1 Feb. 26, 2004

(30) Foreign Application Priority Data

Jun. 7, 2002 (EP) ................................. 02012736
Jun. 25, 2002 (EP) ................................. 02014189

(51) Int. Cl.
*G06K 9/48* (2006.01)
(52) U.S. Cl. ....................... 382/199; 382/264; 382/266; 382/274
(58) Field of Classification Search ................ 382/199, 382/260–265, 266, 172, 173, 274
See application file for complete search history.

(56) References Cited

U.S. PATENT DOCUMENTS 4,571,635 A 2/1986 Mahmoodi et al.
5,081,692 A * 1/1992 Kwon et al. ................. 382/263
6,198,089 B1 * 3/2001 Shi .......................... 250/208.2

FOREIGN PATENT DOCUMENTS

EP 0 357 842 A1 3/1990
WO PCT WO 99/28853 A1 6/1999

OTHER PUBLICATIONS

Image Enhancement via Adaptive Unsharp Masking, Polesel et al., Mar. 2000, IEEE, pp. 505-510.*
Ahuja, Narendra et al., "Neighbor Gray Levels as Features in Pixel Classification", Pattern Recognition, Nov. 14, 1979, vol. 12, Pergamon Press, Ltd., Great Britain.
Chan, Francis H.Y. et al, "Adaptive Thresholding by Variational Method", IEEE Transactions on Image Processing, Mar. 1998, pp. 468-473, vol. 7, No. 3.

(Continued)

*Primary Examiner*—Jingge Wu
*Assistant Examiner*—John B Strege
(74) *Attorney, Agent, or Firm*—Fenwick & West LLP

(57) ABSTRACT

For object recognition, an image is segmented into areas of similar homogeneity at a coarse scale, which are then interpreted as surfaces. Information from different spatial scales and different image features is simultaneously evaluated by exploiting statistical dependencies on their joint appearance. Thereby, the local standard deviation of specific gray levels in the close environment of an observed pixel serves as a measure for local image homogeneity that is used to get an estimate of dominant global object contours. This information is then used to mask the original image. Thus, a fine-detailed edge detection is only applied to those parts of an image where global contours exist. After that, said edges are subject to an orientation detection. Moreover, noise and small details can be suppressed, thereby contributing to the robustness of object recognition.

24 Claims, 3 Drawing Sheets

OTHER PUBLICATIONS

Goerick, Christian et al., "Local Orientation Coding and Neural Network Classifiers with an Application to Real Time Car Detection and Tracking", Proceedings of the 16th Symposium on the DAGM and the 19th Workshop of the OAGM, Springer-Verlag, 1994.

Kalinke, Thomas, "Entropie als maβ des lokalen Informationsgehalts in Bildern zur Realisierung einer Aufmerksamkeitssteuerung", Internal Report 96-0.7, Institut fur Neuroinformatic der Ruhr-Universitat Bochum, 1996, pp. 627-634, Springer-Verlag, Berlin/Heidelberg.

Li, Liyuan et al., "Gray-Level Image Thresholding Based on Fisher Linear Projection of Two-Dimensional Histogram", Pattern Recognition, 1997, pp. 743-749, vol. 30, No. 5, Elsevier Science Ltd., Great Britain.

Perkins, W.A., "Area Segmentation of Images Using Edge Points", IEEE Transactions on Pattern Analysis and Machine Intelligence, Jan. 1980, pp. 8-15.

Prager, John M., "Extracting and Labeling Boundary Segments in Natural Scenes", IEEE Transactions on Pattern Analysis and Machine Intelligence, Jan. 1980, pp. 16-26, vol. PAMI-2, No. 1.

European Search Report, European Application No. 02014189, Sep. 5, 2003, 3 pages.

Stein, R.A., Boyd, J.E., "Evaluation of the Variance Function for Edge Enhancement in Multidimensional Data", IEEE Proceedings ISCAS, 1988, pp. 2553-2556.

Bezdek, James C., et al., "A Geometric Approach to Edge Detection", IEEE Transactions on Fuzzy Systems, vol. 6, No. 1, XP-000734649, Feb. 1, 1988, pp. 52-75.

* cited by examiner

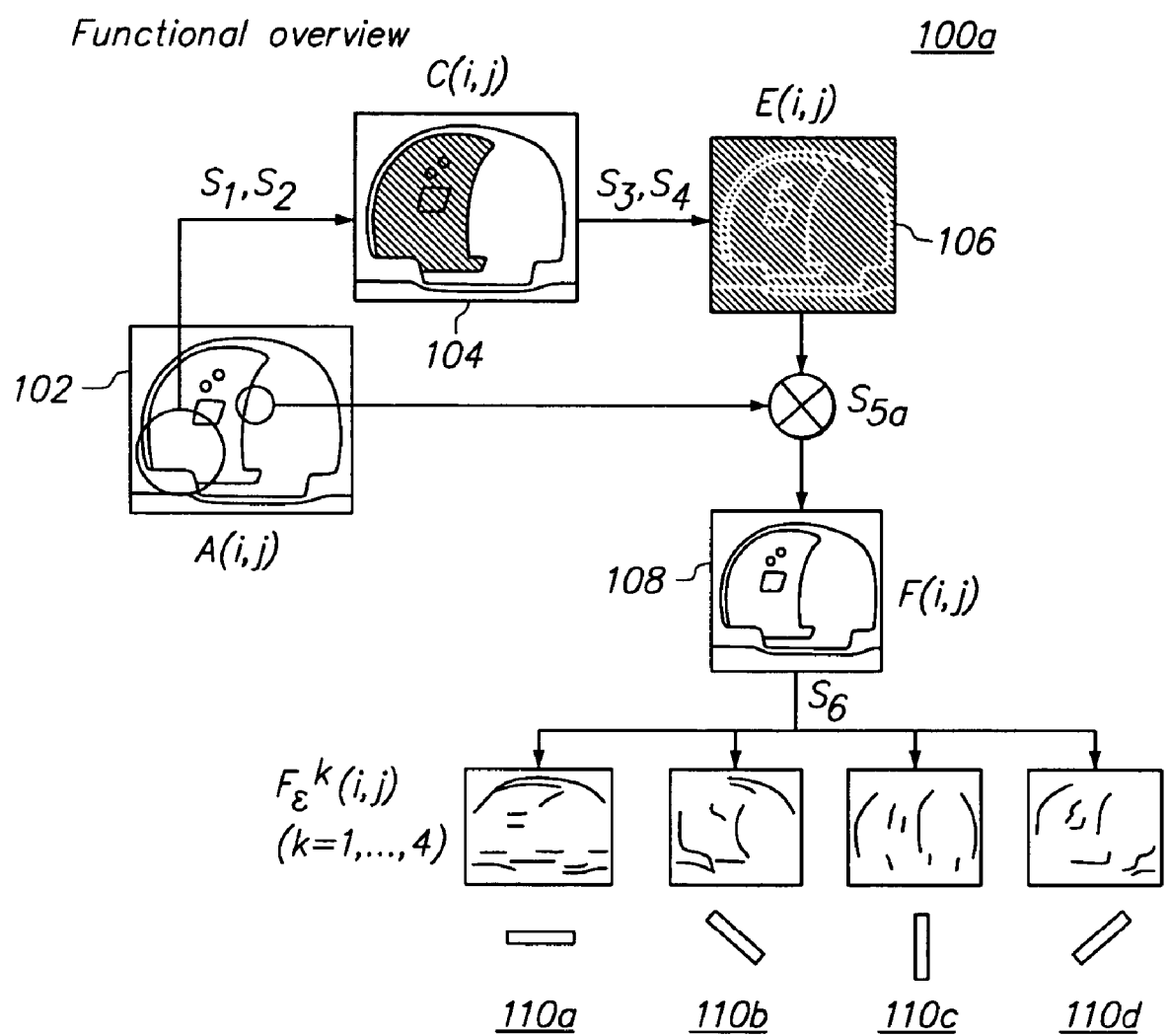

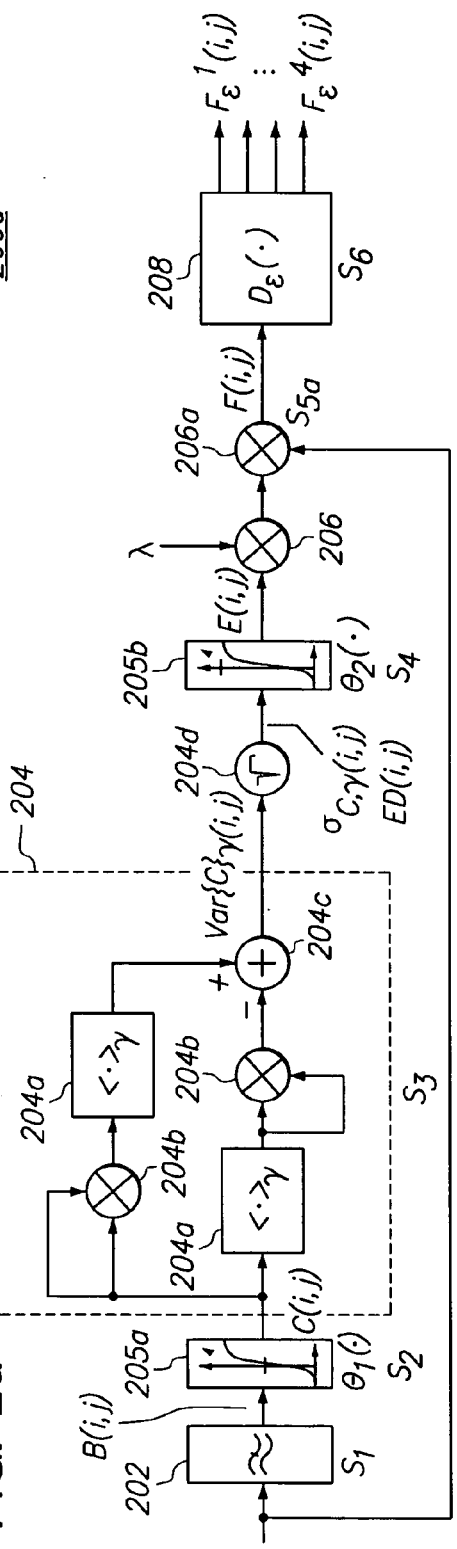
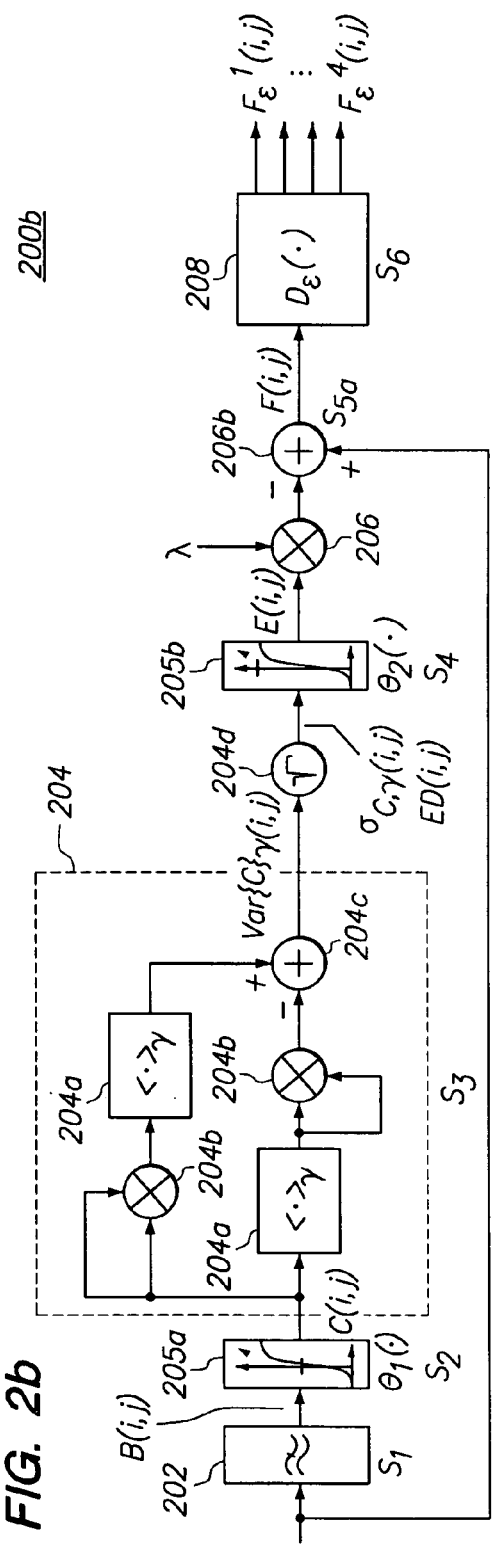

PREPARATION OF A DIGITAL IMAGE WITH SUBSEQUENT EDGE DETECTION

RELATED APPLICATIONS

This application is related to and claims priority from European Patent Applications No. 02 012 736.1 filed on Jun. 7, 2002 and 02 014 189.1 filed Jun. 25, 2002 by Marc-Oliver Gewaltig, Edgar Körner, and Ursula Körner and titled "Preparation of a Digital Image with Subsequent Edge Detection".

FIELD OF THE INVENTION

The invention relates to the field of object recognition, more precisely, to a contour and surface detection technique in an object recognition system for digitized images. The invention can advantageously be used for the segmentation of prominent objects, and to an edge detection algorithm using oriented line segments (edges) to recognize larger objects.

BACKGROUND OF THE INVENTION

Pattern and object recognition systems that are capable of performing an automated scene analysis and/or object identification can be used for a variety of tasks.

In order to recognize objects in an image, it is necessary to first separate those parts of the image which belong to objects (foreground) from those parts of the image which do not (background). This process is usually referred to as "image segmentation". Image segmentation is typically performed for object recognition in a digital image, since objects should be recognized irrespective of their background. Algorithms that are capable of performing this step are called "segmentation algorithms".

Most standard algorithms exploit the fact that objects are separated from the background by a more or less well defined border. They perform the segmentation step by first decomposing the image into small "elementary features", like oriented line segments, which are then used to successively construct larger objects. Segmented objects are, thus, described in terms of said elementary features.

This approach has several problems. One problem is the choice of a suitable method for extracting object borders from the intensity values of the digital image. This problem becomes worse if the intensity changes between objects and background are small, or if the intensity variations within an object are comparable to those between object and background. In order to overcome this problem, a number of image enhancement techniques are used which seek to improve the visual appearance of an image in such a way that the contrast between objects and background are amplified. Another common problem is the choice of a suitable method for compiling an object from the set of elementary features. This problem becomes even worse if the image contains more than one object, or if the object is surrounded by a possibly large number of distracting objects (clutter).

Important issues related to image segmentation are choosing good segmentation algorithms, measuring their performance, and understanding their impact on the scene analysis system.

According to the state of the art, there are different solutions to the problem of object segmentation and recognition. In order to understand the main idea of the underlying invention, it is necessary to briefly describe some of their basic features.

1. Histogram Thresholding

In "Analysis of Natural Scenes" (PhD Thesis, Carnegie Institute of Technology, Dept. of Computer Science, Carnegie-Mellon University, Pittsburgh, Pa., 1975) by R. B. Ohlander, a thresholding technique that can advantageously be applied to segmenting outdoor color images is proposed. It is based on constructing color and hue histograms. The picture is thresholded at its most clearly separated peak. The process iterates for each segmented part of the image until no separate peaks are found in any of the histograms.

In their article "Gray-Level Image Thresholding Based on a Fisher Linear Projection of a Two-Dimensional Histogram" (Pattern Recognition, vol. 30, No. 5, pp. 743-749, 1997, incorporated herein by reference), the authors L. Li, J. Gong and W. Chen propose that the use of two-dimensional histograms of an image is more useful for finding thresholds for segmentation rather than just using gray-level information in one dimension. In 2D-histograms, the information on point pixels as well as the local gray level average of their neighborhood is used.

2. Edge-Based Segmentation

In the article "Neighbor Gray Levels as Features in Pixel Classification" (Pattern Recognition, vol. 12, pp. 251-260, 1980, incorporated herein by reference) by N. Ahuja, A. Rosenfeld and R. M. Haralick, it is described how pixel-neighborhood elements can be used for image segmentation.

In the article "Extracting and Labeling Boundary Segments in Natural Scenes" (IEEE Transactions on Pattern Analysis and Machine Intelligence, vol. 2, No. 1, pp. 16-27, 1980, incorporated herein by reference) by J. M. Prager, a set of algorithms used to perform a segmentation of natural scenes via boundary analysis is disclosed. The aim of these algorithms is to locate the boundaries of an object correctly in a scene.

In "Area Segmentation of Images using Edge Points" (IEEE Transactions on Pattern Recognition and Machine Intelligence, vol. 2, No. 1, pp. 8-15, 1980, incorporated herein by reference) by W. A. Perkins, an edge-based technique for an image segmentation is employed. Therein, it is shown that edge-based segmentation has not been very successful due to small gaps that allow merging dissimilar regions.

A different adaptive thresholding algorithm for image segmentation using variational theory is proposed in the article "Adaptive Thresholding by Variational Method" (IEEE Transactions on Image Processing, vol. 2, No. 3, pp. 168-174, 1998, incorporated herein by reference) by F. H. Y. Chan, F. K. Lam and H. Zhu.

A further approach for an image processing based on edge detection can be found in the article "Local Orientation Coding and Neural Network Classifiers with an Application to Real-Time Car Detection and Tracking" (in: W. G. Kropatsch and H. Bischof [editors], Mustererkennung 1994, Proceedings of the 16th Symposium of the DAGM and the 18th Workshop of the OAGM, Springer-Verlag, 1994, incorporated herein by reference) by C. Goerick and M. Brauckmann.

Besides these approaches mentioned above, image representations based on Gabor functions (GFs) and/or other similar wavelets have shown to be very useful in many applications such as image coding and compression, enhancement and restoration, or analysis of texture. Moreover, GFs are frequently used in the scope of multi-scale filtering schemes, e.g. in current models of image representation in the visual cortex as they offer a good approximation to the receptive fields of simple cortical cells. however, GFs are not orthogonal and, as a consequence, the classic Gabor expansion is computationally expensive as GFs are based on unusual dual basis functions. Said reconstruction requires the use of iterative algorithms, Artificial Neural Networks (ANNs), or the inversion of large matrices. These problems can partially be overcome by using a redundant, multi-scale filtering implementation. Among the many wavelet, multi-resolution pyramids and related schemes using different basis functions (such as Gaussian derivatives, steerable filters, etc.), those based on GFs involve several advantages:

maximization of joint localization in both spatial and frequency domain, flexibility because GFs can freely be tuned to a continuum of spatial positions, frequencies and orientations, using arbitrary bandwidths, the fact that GFs are the only biologically plausible filters with orientation selectivity that can exactly be expressed as a sum of only two separable filters, and their good performance in a large variety of applications.

For all these reasons, Gabor functions are especially suitable for performing early processing tasks in multipurpose environments of image analysis and machine vision.

In the article "Entropie als Maβ des lokalen Informationsgehalts in Bildern zur Realisierung einer Aufinerksamkeitssteuerung" (Internal Report 96-0.7, Institut fur Neuroinformatik der Ruhr-Universitat Bochum, 1996, published in: Mustererkennung 1996, pp. 627-634, Springer-Verlag, Berlin/Heidelberg, 1996, incorporated herein by reference) by T. Kalinke and W. von Seelen, an attention control system providing an image segmentation for a non-specific object recognition is disclosed. Based on the information theory introduced by C. Shannon, the local information content of digital images is estimated. Thereby, image entropy is used as a measure for the expected information content of an image part. In this connection, different parameters such as mask size, subsampling factor, entropy threshold and specific parameters of morphological operators allow both problem- and task specific image processing.

In spite of many attempts to construct optimal object recognition systems (e.g. based on edge detection), it can be shown that the known algorithms often have problems in object segmentation at locations where lines and edges are very close and/or intersect. Since conventional edge detection algorithms are only capable of recognizing a plurality of very small (simply- or multiply-connected) image patches, it is impossible to resolve local ambiguities, e.g. caused by crossing lines. Consequently, the underlying recognition system is not able to distinguish between many small objects on a cluttered background and one large object consisting of different parts that belong together. For this reason, global information about the contours of an object that has to be recognized is required. In general, these problems occur in case of images that contain many different objects or in case of objects on a cluttered background.

Another problem is that these object recognition systems have to be adjusted to the used image or image family. Moreover, there are still very few algorithms which are able to detect and classify lines and edges (events) simultaneously.

SUMMARY OF THE INVENTION

In view of the explanations mentioned above, it is the object of the invention to propose a technique rendering a subsequently following edge detection process more efficient. This object is achieved by means of the features recited in the claims.

It should be noted that in the following description, the use of "edges", "edge-free", or the like, has always to be understood in the sense of the "interpretation" carried out by the process according to the present invention. These expressions are not used in their absolute literal meaning.

According to a first aspect of one embodiment of the present invention a method for the preparation of a digital image for a subsequent pattern recognition process is proposed, wherein the method emphasizes prominent objects in the digital image. The local standard deviation of the image is evaluated by replacing the value of each pixel of the digital image by the standard deviation value of the gray levels of the pixels in a defined neighborhood of a pixel to thus generate a mask image. The original digital image is then combined with the generated mask image. The weight of the mask image can have several features. For example, the weight of the mask image can be adjustable when combining the original image with the mask image, or it can be adjusted by combining the mask image with an adjustable weight mask. Further, the weight mask can be designed such that only a portion of the original digital image is combined with the mask image.

According to another aspect of one embodiment of the invention a method for the preparation of a digital image for a subsequent pattern recognition is proposed, the method emphasizing prominent objects in the digital image. Thereby pixels of the digital image that belong to an edge-free surface are detected by evaluating the local standard deviation of the image.

The local standard deviation of the image can be evaluated by replacing the value of each pixel of the digital image by the standard deviation value of the gray levels of the pixels in a defined neighborhood of a pixel to generate a mask image. The original digital image can be combined with the mask image to generate a combined image. Finally an edge detection may be carried out on the combined image.

The step of combining the original digital image with the mask image can be carried out in several ways. For example, in one embodiment, it can be carried out such that the edge detection is inhibited in areas of the digital image which are evaluated as belonging to a surface. In an alternative embodiment, the step of combining the original digital image with the mask image can be carried out such that the edge detection is inhibited in areas of the digital image that are evaluated as not belonging to a surface. In another embodiment, the edge detection can be carried out by means of a convolution of the combined image with oriented Gabor patches.

There are several advantageous variations of the present invention. For example, in one embodiment, the step of evaluating the local standard deviation can be carried out in two orthogonal directions to thus define a standard deviation vector indicating a main orientation of the border of a surface area. In another embodiment, the values of pixels in the main orientation can be enhanced while those of pixels off the main orientation are suppressed. In an alternative embodiment, a threshold for the step of evaluating the local standard deviation can be adjustable. In yet another embodiment, the original digital image can be low-pass filtered before the step of evaluating the local standard deviation. Similarly, in another embodiment, a threshold function depending on the mean gray level of the image can be applied to the low-pass filtered digital image and/or the mask image to enhance the contrast.

According to still another aspect of one embodiment of the present invention a computer software program product implementing a method as set forth above when running on a computing device as well as a recording medium recorded with such a computer software program product are proposed.

Finally the invention proposes systems presenting means for implementing the methods as explained above.

BRIEF DESCRIPTION OF THE DRAWINGS

Further advantages and possible applications of the underlying invention are depicted in the following drawings.

FIG. 1a presents a flow chart showing a functional overview of the proposed object detection algorithm according to one embodiment the present invention.

FIG. 2a presents a simplified block diagrams for a hardware realization of an object recognition system according to one embodiment the present invention.

FIG. 2b presents a simplified block diagrams for an alternative hardware realization of an object recognition system according to one embodiment the present invention.

DETAILED DESCRIPTION OF THE INVENTION

Figure 1B:
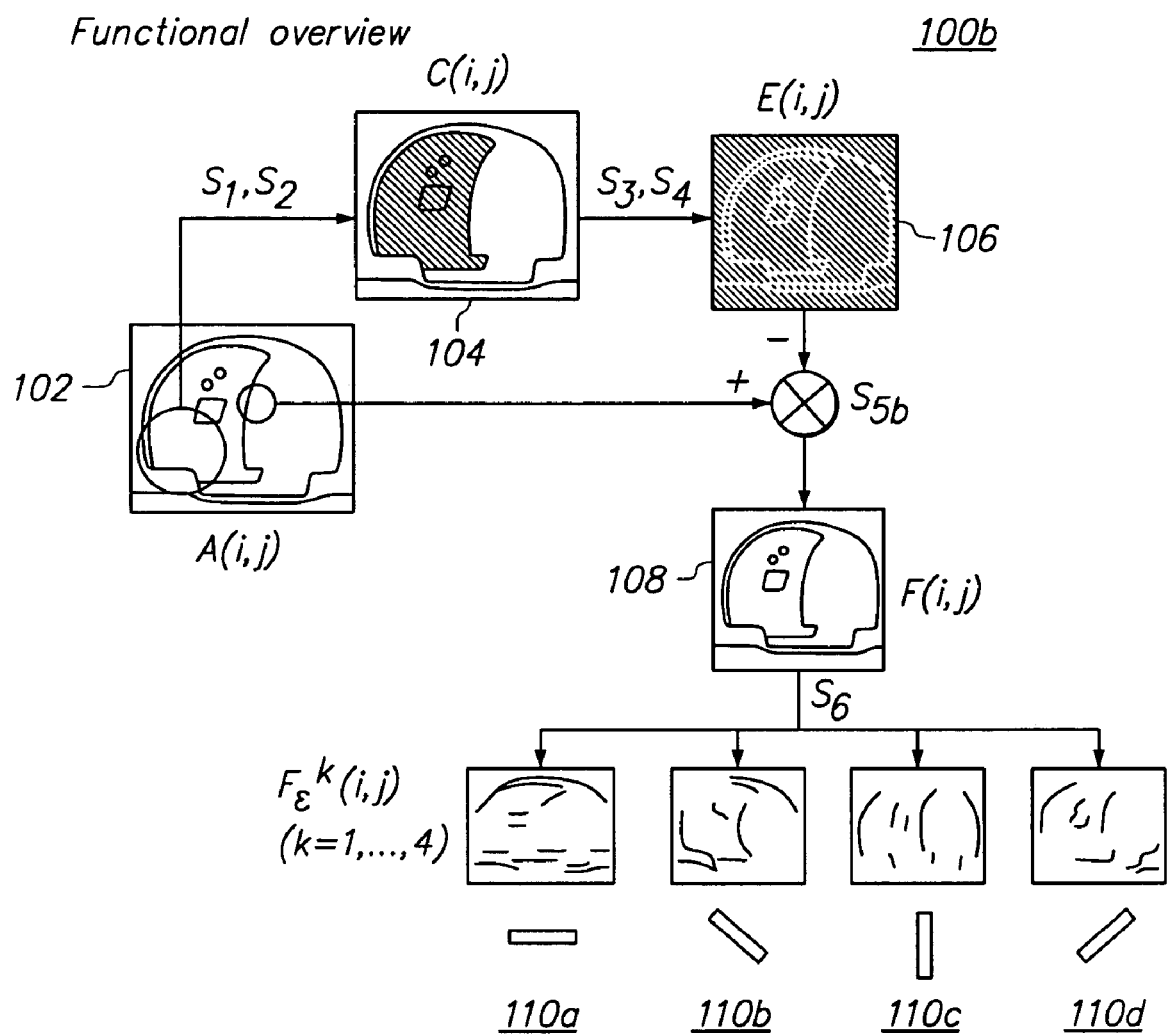
FIG. 1b presents a flow chart showing an alternative functional overview of the proposed object detection algorithm according to one embodiment the present invention.

The invention can be used to solve several recognition and object detection problems, particularly, one embodiment of the present invention may be optimized for simultaneously evaluating information from different spatial scales as well as different image features by exploiting statistical dependencies on their joint appearance, which are applied to constructively guide a local edge detection process.

Referring to FIGS. 1a and 1b, in one embodiment, the proposed technique according to the main idea of the underlying invention prepares a digital image 102 for a subsequent pattern recognition process S6, wherein the method emphasizes prominent objects in the digital image 102.

It should be noted that in the following description, "edges", "edge-free", and the like, has always to be understood in the sense of the "interpretation" carried out by the process according to the present invention.

In one embodiment, the technique can be divided into the six steps S1 through S6 as depicted in FIG. 1a. In the following sections, these steps shall be described in detail. Sample block diagrams for hardware realization of the procedure as shown in FIG. 2a and FIG. 2b shall be explained. The meaning of the symbols designated with reference signs in FIGS. 1 and 2 can be taken from the appended table of reference signs.

According to one embodiment of the present invention, in a first step S1, a digital input image $A(i,j)$ to be recognized is submitted to a convolution with a Gaussian kernel $h(i,j)$ having the standard deviation $\sigma_1$. The convolution is realized by a low-pass filter 202 in FIGS. 2a, 2b and reduces noise and fine details by smoothing said input image $A(i,j)$. Thereby, said pixel indices i and j respectively run in direction of the x- and y-axis of said image.

The next step S2 enhances the contrast of the low-pass filtered image. Global structures are recovered by applying a sigmoid threshold function $\Theta_1(\cdot)$, thereby yielding $$C(i,j) := \Theta_1[B(i,j)] \text{ with } B(i,j) := (A * h)(i,j) \forall i,j,$$

wherein the asterisk ("*") denotes a convolution operation, and the sigmoid threshold function $\Theta_1(\cdot)$ may e.g. be represented by the following formula:

$$\Theta_1[B(i,j)] := \frac{1}{1+\exp[-2 \cdot \mu_1 \cdot (\vartheta_1 - B(i,j))]} \quad \forall\, i,j\,(\mu_1 > 0)$$

with $\vartheta_1 := \langle B \rangle = \frac{1}{N} \cdot \sum_{(i,j)} B(i,j),$ wherein
$\mu_1$ is the slope factor of said threshold function $\Theta_1(\cdot)$
N denotes the number of pixels in the image, and
$\theta_1$ denotes the applied threshold value.

Said threshold $\theta_1$ is automatically chosen according to the mean gray level $\langle B \rangle$ of the low-pass-filtered input image $B(i,j)$. Thereby, an automatic local calibration (auto-calibration) of this step can be achieved.

In the next step S3, pixels of the digital image belonging to the same edge-free region are detected. A surface therefore is defined by an area not presenting edges according to the "interpretation" carried out by the process according to the present invention. Therefore the image is separated not by edges, but by defining adjoining (edge-free) surfaces.

The detection of the pixels belonging to the same edge-free region can be carried out by calculating the local standard deviation $\sigma_{c,\gamma(i,j)}$ of the gray levels within a local (circular) neighborhood $\gamma(i,j)$ of the point $(i,j)$ described by the observed pixel as given by the formula $$D(i,j) := \sigma_{c,\gamma(i,j)} = \sqrt{\text{Var}\{C\}_{\gamma(i,j)}}$$

$$= \sqrt{E\{(C - E\{C\}_{\gamma(i,j)})^2\}_{\gamma(i,j)}} = \sqrt{\langle C^2 \rangle_{\gamma(i,j)} - \langle C \rangle^2_{\gamma(i,j)}}$$

$$\sqrt{\frac{1}{P} \cdot \sum_{(m,n)\in\gamma(i,j)} (C(i-m, j-n) - \langle C(i,j)\rangle_\gamma)^2} \quad \forall\, i,j$$

thereby using the result $C(i,j)$ obtained after having applied the first steps (S1, S2), and $$E\{C\}_{\gamma(i,j)} \equiv \langle C \rangle_{\gamma(i,j)} = \frac{1}{P} \cdot \sum_{(m,n)\in\gamma(i,j)} C(i-m, j-n) \forall\, i,j,$$

wherein
$\gamma(i,j)$ denotes a local (circular) neighborhood of the point $(i,j)$ described by the observed pixel, $\langle C \rangle_{\gamma(i,j)}$ represents the local average of the gray level of the image $C(i,j)$ within said environment $y(i,j)$ around the point $(i,j)$ after having applied said noise filtering (S1), and $\sigma_{c,\gamma(i,j)}$ represents the local standard deviation of the gray level of the image $\gamma(i,j)$ within said environment $\gamma(i,j)$, and P is the number of pixels in said environment $\gamma(i,j)$.

For this purpose, the value of each pixel is replaced by the standard deviation value $\sigma_{c,\gamma(i,j)}$ of the gray levels within the neighborhood y around the point $(i,j)$ described by the respective pixel, thereby obtaining the result image $D(i,j)$.

The standard deviation $\sigma_1$ (the width) of the Gaussian low-pass filter 202 as well as the size of the circular environment $\gamma$ define the spatial scale of the surface detection S3.

According to a particular embodiment of the present invention, the local standard deviation can be calculated in two orthogonal directions to generate a two-dimensional standard deviation vector. The standard deviation vector thus indicates the dominating (main) direction of the contours of a prominent object of the image. If therefore said main direction is enhanced while secondary directions are suppressed, the contours of an object can be further emphasized.

In a further step S4, another sigmoid threshold function $\Theta_2(\cdot)$ with a very steep slope $_{\mu 2}$ can then be deployed to enhance contrasts by separating pixels which belong to the respective surface from those pixels which do not belong to it:

$$E(i,j) := \Theta_2[D(i,j)] \forall i,j$$

Thereby, values close or equal to zero are assigned to pixels lying within the respective surface.

The sigmoid threshold function $\Theta_2(\cdot)$ may be represented by the formula $$\Theta_2[D(i,j)] := \frac{1}{1 + \exp[-2 \cdot \mu_2 \cdot (\vartheta_2 - D(i,j))]} \quad \forall i,j (\mu_2 > 0)$$

$$\text{with } \vartheta_2 := \langle D \rangle = \frac{1}{N} \cdot \sum_{(i,j)} D(i,j)$$

wherein
$\mu_2$ is the slope factor of said threshold function $\Theta_2(\cdot)$
N denotes the number of pixels in the image, and
$\theta_2$ denotes the applied threshold value.

Said threshold $\theta_2$ is determined from the mean gray level $\langle D \rangle$ of the above-defined image D(i,j). Again, an automatic local calibration of this step S4 is thereby achieved.

In a further step (S5a or S5b, respectively) the original image is combined ("masked") with the resulting image E(i,j) of the previous step. Said masking can be executed e.g. by applying the formula $$F(i,j) := [(\lambda \cdot E) \circ A](i,j) \forall i,j (\text{with } \lambda \geq 0),$$

wherein the composition operator ("o") can be replaced by a pixel-wise multiplication S5a (or addition S5b) of the original image 102 and the surface image 106, expressed by means of the operators "⊗" (or "⊕", respectively).

In this step, the weighting factor $\lambda$ of said surface image 106, which controls how strong the surface detection S3 shall determine the subsequent edge detection S6, can be adjusted by combining the surface image 106 with an adjustable weight mask. The weighting factor $\lambda$ can be chosen uniformly for the entire image 102 or individually for a specific region of interest.

According to a further option the weight mask can be designed in such a way that only a portion of the original digital image 102 is combined with the surface image 106.

In the last step S6, an edge detection is performed on the image F(i,j). As the edge detection is inhibited in areas that are taken as belonging to the same edge-free surface and thus limited to areas containing edges, the efficiency of the edge detection can be enhanced. A fine-detailed edge detection S6 is typically only applied to those parts of an image 102 where global contours exist.

It should be noted that alternatively the edge detection could also be inhibited in areas containing edges to suppress prominent objects in the image. This can be implemented by using an inverse masking in step S5a or S5b, respectively.

The edge detection can, for example, be performed by means of a convolution of the contour image F(i,j) with oriented Gabor patches. The standard deviation $\sigma_2$ (the width) of the Gabor kernels should be as small as possible, e.g. size 3×3 pixels. By contrast, the standard deviation $\sigma_1$ (the width) of the Gaussian kernel should be considerably larger, e.g. size 12×12 pixels. In this connection, it should be noted that the size of the neighborhood $\gamma$, which is needed for the estimation of the local standard deviation $\sigma_{c,\gamma(i,j)}$, should be chosen between $\sigma_1$ and $\sigma_2$.

According to one embodiment of the underlying invention, a circular patch with five pixel in diameter is used.

A program for executing the operation shown in FIGS. 1a and 1b may be stored in a computer readable storage medium, and this stored program may be executed on a computer system, so as to perform the object detection. The computer readable storage medium may also be a device for temporarily storing the program, such as a volatile memory (i.e. a RAM) in the computer system which functions as a server or client for receiving the program sent via a network (e.g. the Internet) or a communication line (e.g. a telephone line). The invention may be implemented by a hardware shown in FIGS. 2a and 2b.

There are several advantages of the present invention. Some of these advantages are shown below by way of example:

- The concept according to one embodiment of the present invention can work on different scales in parallel: at a coarse scale, the image is segmented into areas of similar homogeneity, these areas being interpreted as surfaces. This effectively selects a global object borders, independent of the local edge information.
- Local ambiguities are resolved by integrating global surface and local edge information.
- Noise and small details are suppressed which contributes to the robustness of the image recognition.
- Finally, parameters of the technique according to the invention are automatically adjusted according to the mean gray-level of the image.

What we claim is:

1. A method for preparing a digital input image for a subsequent pattern recognition process, and for emphasizing prominent objects in the digital input image, the digital input image comprising pixels and the pixels having values, the method comprising the following steps:

filtering the digital input image with a low-pass filter to obtain a low-pass filtered digital image;
    evaluating a local standard deviation of the low-pass filtered digital image by replacing the value of each pixel of the low-pass filtered digital image by a standard deviation value of gray levels of the pixels in a defined neighborhood of the pixel to generate a mask image; and
    combining the digital input image with the mask image in accordance with a weight mask indicating a weight to be given to pixels of the mask image relative to corresponding pixels of the digital input image, the weight mask designed such that only a portion of the digital input image is combined with the mask image.

2. The method of claim 1, wherein the weight mask is adjustable.

3. The method of claim 1, wherein the step of evaluating the local standard deviation is carried out in two orthogonal directions to define a standard deviation vector indicating a main orientation of the contour of a surface area.

4. The method of claim 3, wherein the values of pixels in the main orientation are enhanced while those of pixels off the main orientation are suppressed.

5. The method of claim 1, wherein a threshold for the step of evaluating the local standard deviation is adjustable.

6. The method of claim 1, wherein a threshold function depending on a mean gray level of the digital input image is applied to the low-pass filtered digital image to enhance the contrast.

7. The method of claim 1, wherein a threshold function depending on a mean gray level of the digital image is applied to the mask image to enhance the contrast.

8. A computer readable medium embodying a computer program for performing the steps of claim 1.

9. A method for preparing a digital input image for a subsequent pattern recognition, and for emphasizing prominent objects in the digital input image, the method comprising the steps of:
  filtering the digital input image with a low-pass filter to obtain a low-pass filtered digital image;
  detecting pixels of the low-pass filtered digital image which belong to an edge-free surface by evaluating a local standard deviation of the low-pass filtered digital image to generate a mask image; and
  combining the digital input image with the mask image in accordance with a weight mask indicating a weight to be given to pixels of the mask image relative to corresponding pixels of the digital input image, the weight mask designed such that only a portion of the digital input image is combined with the mask image.

10. A method for the detection of edges in a digital input image having pixels and the pixels having values, the method comprising the following steps:
  filtering the digital input image with a low-pass filter to obtain a low-pass filtered digital image;
  evaluating a local standard deviation of the low-pass filtered digital image by replacing the value of each pixel of the low-pass filtered digital image by a standard deviation value of gray levels of the pixels in a defined neighborhood of the pixel to generate a mask image;
  combining the digital input image with the mask image in accordance with a weight mask indicating a weight to be given to pixels of the mask image relative to corresponding pixels of the digital input image to generate a combined image; and
  carrying out an edge detection on the combined image, the weight designed so that the edge detection is inhibited in areas of the digital input image that are evaluated as belonging to a surface.

11. The method of claim 10, wherein the edge detection is carried out by means of a convolution of the combined image with oriented Gabor patches.

12. The method of claim 10, wherein the step of evaluating the local standard deviation is carried in two orthogonal directions to thus define a standard deviation vector indicating a main orientation of the contour of a surface area.

13. The method of claim 12, wherein the values of pixels in the main orientation are enhanced while those of pixels off the main orientation are suppressed.

14. The method of claim 10, wherein a threshold for the step of evaluating the local standard deviation is adjustable.

15. The method of claim 10, wherein a threshold function depending on a mean gray level of the digital input image is applied to the low-pass filtered digital image to enhance the contrast.

16. The method of claim 10, wherein a threshold function depending on a mean gray level of the digital input image is applied to the mask image to enhance the contrast.

17. A computer readable medium embodying a computer program for performing the steps of claim 10.

18. A system for preparing a digital input image for a subsequent pattern recognition, the digital input image having pixels and the pixels having values, and the system emphasizing prominent objects in the digital input image and comprising:
  means for filtering the digital input image with a low-pass filter to obtain a low-pass filtered digital image;
  means for evaluating a local standard deviation of the low-pass filtered digital image by replacing the value of each pixel of the low-pass filtered digital image by a standard deviation value of gray levels of the pixels in a defined neighborhood of the pixel to generate a mask image; and
  means for combining the digital input image with the mask image in accordance with a weight mask indicating a weight to be given to pixels of the mask image relative to corresponding pixels of the digital input image, the weight mask designed such that only a portion of the digital input image is combined with the mask image.

19. A system for preparing a digital input image for a subsequent pattern recognition, the system emphasizing prominent objects in the digital input image and comprising:
  means for filtering the digital input image with a low-pass filter to obtain a low-pass filtered digital image;
  means for detecting pixels of the low-pass filtered digital image which belong to an edge-free surface by evaluating a local standard deviation of the low-pass filtered digital image to generate a mask image; and
  means for combining the digital input image with the mask image in accordance with a weight mask indicating a weight to be given to pixels of the mask image relative to corresponding pixels of the digital input image, the weight mask designed such that only a portion of the digital input image is combined with the mask image.

20. A system for the detection of edges in a digital input image having pixels and the pixels having values, the system comprising:
  means for filtering the digital input image with a low-pass filter to obtain a low-pass filtered digital image;
  means for evaluating a local standard deviation of the low-pass filtered digital image by replacing a value of each pixel of the low-pass filtered digital image by a standard deviation value of gray levels of pixels in a defined neighborhood of the pixel to generate a mask image;
  means for combining the digital input image with the mask image in accordance with a weight mask indicating a weight to be given to each pixel of the mask image relative to a corresponding pixel of the digital input image to generate a combined image; and
  means for detecting edges on the combined image, the weight mask designed so that the edge detection is inhibited in areas of the digital input image that are evaluated as belonging to a surface.

21. A method for recognizing an object, the method comprising the following steps:
   generating a low-pass filtered image by low-pass filtering an input image with a Gaussian kernel, the input image having pixels and the pixels having values;
   enhancing a contrast of the low-pass filtered image;
   generating a second low-pass filtered image by detecting surfaces of the low-pass filtered image based on local variance by replacing the value of each pixel of the input image by the standard deviation value of gray levels of the pixels in a defined neighborhood of the corresponding pixel;
   enhancing the contrast of the second low-pass filtered image to obtain an enhanced image;
   combining the input image and the enhanced image in accordance with a weight mask indicating weight to be given to each pixel of the enhanced image relative to a corresponding pixel of the input image to obtain a contour image; and
   detecting oriented edges of the contour image, the weight mask designed so that the oriented edge detection is inhibited in areas of the input image that are evaluated as belonging to a surface.

22. An apparatus for recognizing objects, the apparatus comprising:
   a low-pass filter for filtering an input image with a Gaussian kernel;
   a first enhancement section for enhancing the contrast of the low-pass filtered image;
   a first detection section for detecting surfaces of the low-pass filtered image based on the local-variance by replacing the value of each pixel of the input image by the standard deviation value of gray levels of the pixels in a defined neighborhood of the corresponding pixel;
   a second enhancement section for enhancing the contrast of the low-pass filtered image to obtain an enhanced image;
   a combining section for combining the input image with the enhanced image in accordance with a weight mask indicating weight to be given to each pixel of the input image relative to a corresponding pixel of the enhanced image to obtain a contour image; and
   a second detection section for detecting oriented edges of the contour image, the weight mask designed so that the edge detection is inhibited in areas of the digital image that are detected as belonging to a surface.

23. The method of claim 1, wherein the low-pass filter is a Gaussian kernel.

24. The method of claim 10, wherein the low-pass filter is a Gaussian kernel.

* * * * *